(12) United States Patent
Edlund et al.

(10) Patent No.: US 8,990,679 B2
(45) Date of Patent: Mar. 24, 2015

(54) EXTENSIBLE MARKUP LANGUAGE RENDERING AND LAYOUT

(75) Inventors: Carl A. Edlund, Bellevue, WA (US); Samuel W. Bent, Bellevue, WA (US); Michael E. D. Winser, Westport, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1072 days.

(21) Appl. No.: 13/009,615

(22) Filed: Jan. 19, 2011

(65) Prior Publication Data

US 2011/0113322 A1    May 12, 2011

Related U.S. Application Data

(60) Division of application No. 11/953,513, filed on Dec. 10, 2007, now Pat. No. 7,900,135, which is a continuation of application No. 09/677,403, filed on Sep. 30, 2000, now Pat. No. 7,308,647.

(51) Int. Cl.
*G06F 3/00* (2006.01)
*G06F 17/22* (2006.01)
*G06F 17/21* (2006.01)
*G06T 11/60* (2006.01)

(52) U.S. Cl.
CPC .......... *G06F 17/2247* (2013.01); *G06F 17/212* (2013.01); *G06T 11/60* (2013.01)
USPC .......................................................... 715/234

(58) Field of Classification Search
USPC ................... 715/234, 243, 254, 255
See application file for complete search history.

(56) References Cited

U.S. PATENT DOCUMENTS

| | | |
|---|---|---|
| 5,991,877 A | 11/1999 | Luckenbaugh |
| 6,028,605 A | 2/2000 | Conrad et al. |
| 6,101,510 A | 8/2000 | Stone |
| 6,101,537 A | 8/2000 | Edelstein et al. |
| 6,161,126 A | 12/2000 | Wies et al. |
| 6,275,935 B1 | 8/2001 | Barlow et al. |
| 6,324,551 B1 | 11/2001 | Lamping et al. |
| 6,343,377 B1 | 1/2002 | Gessner et al. |
| 6,442,618 B1 | 8/2002 | Phillips et al. |
| 6,585,777 B1 | 7/2003 | Ramaley et al. |
| 6,636,219 B2 | 10/2003 | Merrick et al. |
| 6,734,873 B1 | 5/2004 | Herf et al. |
| 7,308,647 B1 | 12/2007 | Edlund et al. |
| 7,900,135 B2 | 3/2011 | Edlund |
| 2008/0092066 A1 | 4/2008 | Edlund et al. |

OTHER PUBLICATIONS

"Advisory Action", U.S. Appl. No. 09/677,403, (Apr. 19, 2005),3 pages.

(Continued)

*Primary Examiner* — Kyle Stork
(74) *Attorney, Agent, or Firm* — John Jardine; Kate Drakos; Micky Minhas (57) ABSTRACT

Extensible markup language layout and rendering behaviors are disclosed. A core engine provides existing layout and rendering behaviors for a predetermined markup language, such as HTML. External components are designed to provide extended layout and/or rendering behaviors, in addition to the behaviors of the core engine. A mechanism, which can be part of the core engine, extends the existing behaviors with the behaviors of the external components. The behaviors of the external components can participate with the behaviors of the core engine.

20 Claims, 6 Drawing Sheets

(56) References Cited

OTHER PUBLICATIONS

"Advisory Action", U.S. Appl. No. 09/677,403, (Jun. 25, 2007),3 pages.
"Advisory Action", U.S. Appl. No. 09/677,403, (Aug. 28, 2006),3 pages.
"Final Office Action", U.S. Appl. No. 09/677,403, (Apr. 19, 2007),14 pages.
"Final Office Action", U.S. Appl. No. 09/677,403, (Jun. 12, 2006),14 pages.
"Final Office Action", U.S. Appl. No. 11/953,513, (Sep. 22, 2009),11 pages.
"Final Office Action", U.S. Appl. No. 11/953,513, (Jul. 1, 2010),13 pages.
"Non Final Office Action", U.S. Appl. No. 09/677,403, (Jan. 24, 2006),13 pages.
"Non Final Office Action", U.S. Appl. No. 09/677,403, (Nov. 14, 2006),13 pages.
"Non Final Office Action", U.S. Appl. No. 09/677,403, (May 20, 2004),23 pages.
"Non Final Office Action", U.S. Appl. No. 09/677,403, (Aug. 17, 2005),16 pages.
"Non Final Office Action", U.S. Appl. No. 11/953,513, (May 12, 2009),11 pages.
"Non-Final Office Action", U.S. Appl. No. 11/953,513, (Apr. 7, 2010),11 pages.
"Non-Final Office Action", U.S. Appl. No. 11/953,513, (Aug. 11, 2010),6 pages.
"Notice of Allowance", U.S. Appl. No. 09/677,403, (Oct. 17, 2007),6 pages.
"Notice of Allowance", U.S. Appl. No. 11/953,513, (Dec. 1, 2010),6 pages.
"Restriction Requirement", U.S. Appl. No. 11/953,513, (Mar. 5, 2009),7 pages.
Bateman, Russell "Features of the Novell Kernell Services Programming Environment for NLMs: Part Two", Retrieved from http://support.novell.com/techcenter/articles/dnd19991004.html on Feb. 17, 2011., This was originally retrieved from <http://developer.novell.comlresearch/devnotes/1999/October/04/dpv. htm> and cited in a Non Final Office Action.,(Oct. 1, 1999),17 pages.
"IE Web Authoring Features: Behaviors and HTCs", *Microsoft WebBuilder magazine*, Jun. 1999, Retrieved from msdn.microsoft.com/library/periodic/period99/ie5behaviors.htm, (Jun. 1999),4 Pages.
Apiki, Steve "OLE Controls from the Ground Up", *Byte magazine*, Retrieved from www.byte.com/art/9503/sec13/art4.htm, (Mar. 1995),6 Pages.
Esposito, Dino "Scripting Evolves to a More Powerful Technology: HTML Behaviors in Depth", *Microsoft Internet Development (MIND) Magazine*, Apr. 1999, Retrieved from msdn.microsoft.com/library/periodic/period99/HTMLbehaviors.htm, (Apr. 1999),11 Pages.
Hodges, Douglas "Managing Object Lifetimes in OLE", Retrieved from msdn.microsoft.com/library/techart/msdn.sub.--objlife.htm, (Aug. 25, 1994),40 Pages.
Massy, Dave "Time off for Good Behavior: DHTML Behaviors in Internet Explorer 5", Originally published in Site Builder Magazines, Retrieved from http://msdn.microsoft.com/en-us/library/bb250408 on Feb. 17, 2011, Originally retrieved from msdn.microsoft.com/workshop/essentials/versions/IE5behave.asp,(Mar. 18, 1999),7 pages.

*FIG. 6.*

EXTENSIBLE MARKUP LANGUAGE RENDERING AND LAYOUT

PRIORITY

This application is a divisional of and claims priority to U.S. patent application Ser. No. 11/953,513, filed Dec. 10, 2007, which is a continuation of and claims priority to U.S. Pat. No. 7,308,647, filed Sep. 30, 2000, the disclosures of which are incorporated by reference as if set forth in their entirety for all purposes.

BACKGROUND

Markup languages, such as HTML, are currently the primary manner by which information is exchanged over the worldwide web ("the web") of the Internet, or over related networks such as intranets and extranets. Markup languages in general provide a relatively rich assortment of functionality. Two example types of functionality that are relevant to one or more embodiments include: rendering behaviors, and layout behaviors. A behavior generally refers to an action, or processing, that can be performed in relation to a markup language element. An element in a markup language is a discrete entity that can be the combination of a set of markup language tags, any content contained between the tags, and any attributes the tags may have. Rendering behaviors generally are behaviors that specify how markup language elements are to be rendered, or drawn, on a medium, such as a display screen or on a printed page. Layout behaviors generally are behaviors that specify how markup language elements are to be laid out, or positioned and sized, on the medium.

Core engines that process markup languages, such as those found in web browsing computer programs and components of operating systems, do provide a rich assortment of behaviors for content authors. However, invariably the content authors may want to provide layout and rendering functionality that are not supported by the core engines. For example, the authors may want to position and size markup language elements in a way that is not supported by the core engine, or may want to draw the elements in a way that is not supported by the core engine. The prior art, however, only provides limited support for extensible behaviors. That is, the prior art only provides limited support for extended layout and rendering behaviors that are not supported by the core engine itself.

One way that extended behaviors are supported in the prior art is by using a technology known as a plug-in. Plug-ins are computer programs that can be called by the core engine to completely take over all the behaviors of an element associated with a plug-in, and that are referenced in HTML code. Plug-ins, while useful, have a significant disadvantage in that they take over processing of the element from the core engine on a wholesale basis. The core engine views a plug-in as a black box meant to process a given element or elements. The core engine does not participate in the processing of elements that are processed by the plug-in. Likewise, the plug-in cannot delegate some of the processing to the core engine. The plug-in represents an all-or-nothing affair: either the plug-in takes complete control of processing an element, without support from the core engine, or it does not. As such, the plug-in does not represent a complete solution to content authors' desire to extend behaviors supported by the core engine.

Another limited solution to provide extended behaviors in the prior art is by using dynamic HTML (DHTML) behaviors, which some prior art web browsing computer programs and operating system components support. DHTML behaviors are written similar to scripts, except that the DHTML behaviors can be separated from the HTML content itself. That is, while a script is integrated within the HTML content, a DHTML behavior is referenced within the HTML content. The DHTML behavior itself is still written as a script, but it is a script that is separate from the HTML content that references the behavior. Alternatively, the DHTML behaviors can be written in C++, a common computer programming language. DHTML behaviors are limited in the extensible behaviors that they can support. DHTML behaviors allow multiple HTML elements to be fused together as a single entity, and allow single HTML tags to be extended and enhanced. However, the DHTML behaviors ultimately only extend, enhance, or group together existing behaviors of the core engine. DHTML behaviors are more of a tool to supplement or group together existing behaviors supported by the core engine than a mechanism to develop radically new behaviors. That is, DHTML behaviors allow content authors to approach existing behaviors in a dynamic way, as opposed to creating new behaviors that may be based on, utilize, or otherwise participate with existing behaviors supported by the core engine.

A third approach supported by the prior art to extend behaviors is known as Object Linking and Embedding (OLE). OLE is not specific to markup languages, however. Rather, OLE allows binary software objects with well-defined properties and I/O interfaces to be reused. In the context of HTML, they can be referred to within HTML code in a similar manner to which plug-ins are referenced. While they provide full extensibility of existing behaviors of the core engine, they cannot participate with existing behaviors, but rather replace them, like plug-ins. As such a wholesale approach to behavior extensibility, OLE objects cannot be used to supplement existing behaviors in a minor, albeit subjectively important to the content author, way. OLE objects can be viewed as a plug-in-like technology, but which is based on software objects, instead of software programs, as plug-ins are.

Content authors, therefore, are currently presented with prior art extensibility of behaviors that may not represent how they actually want to extend those behaviors. Minor supplementation and aggregation of existing behaviors can be accomplished by using DHTML behaviors. Complete wholesale replacement of existing behaviors, and providing new behaviors without participation with existing behaviors, can be accomplished by using plug-ins or OLE objects. However, content authors cannot within the prior art provide extended behaviors that participate with existing behaviors beyond the limited supplementation and aggregation supported by DHTML behaviors. While content authors can create completely new behaviors using plug-ins or OLE, these new behaviors cannot be based on and thus cannot participate with existing behaviors.

SUMMARY

One or more embodiments relate to extensible markup language layout and rendering behaviors. A core engine provides existing layout and rendering behaviors for a predetermined markup language, such as HTML. External components are designed to provide extended layout and/or rendering behaviors, in addition to the behaviors of the core engine. A mechanism, which can be part of (included in) the core engine, extends the existing behaviors with the behaviors of the external components. The external components can participate with the functionality of the core engine. They can completely replace comparable functionality provided by the existing behaviors, or can supplement the existing behaviors by participating in their layout or rendering process.

To extend a comparable behavior of the core engine with a behavior of an external component, the mechanism does the following. It calls a behavior initialization method of the external component to learn how the external component's behavior wants to participate with the core engine's comparable behavior. Once this is known, the mechanism then calls a behavior method of the external component that provides the behavior when the core engine is providing the comparable behavior. As a result, the external components' behavior participates with the core engine's comparable behavior. In addition, the mechanism may receive calls from the external component to a corresponding behavior method of the mechanism. This allows the external component to communicate with the core engine during participation of the external component's behavior with the core engine's comparable behavior.

One embodiment provides for advantages not found within the prior art. Complete participation with existing behaviors can be accomplished by the extended behaviors of external components. This is in distinction with DHTML behaviors, which can only accomplish such participation on a limited basis, to supplement in a minor way or group existing behaviors. Furthermore, this is completely unlike extended behaviors that are supported by plug-ins or OLE objects, which cannot participate with existing behaviors at all. As a result, the extended behaviors give content authors a more complete solution to existing behavior extensibility. New behaviors can participate with existing behaviors as much or as little as is desired. The authors are not locked into providing only limited participation, as they are with DHTML behaviors, or never participating with existing behaviors, as they are with plug-ins and OLE objects.

Systems, methods, and computer and machine-readable media of varying scope are encompassed by one or more embodiments. Other aspects, embodiments and advantages, beyond those described here, will become apparent by reading the detailed description and by referencing the drawings.

DETAILED DESCRIPTION

In the following detailed description of various embodiments, reference is made to the accompanying drawings that form a part hereof, and in which is shown by way of illustration, specific embodiments. These embodiments are described in sufficient detail to enable those skilled in the art to practice the embodiments. Other embodiments may be utilized, and logical, mechanical, electrical, and other changes may be made without departing from the spirit or scope of the described subject matter. The following detailed description is, therefore, not to be taken in a limiting sense, and the scope of the described embodiments is defined only by the appended claims.

How Extended Behaviors are Supported

Figure 1:
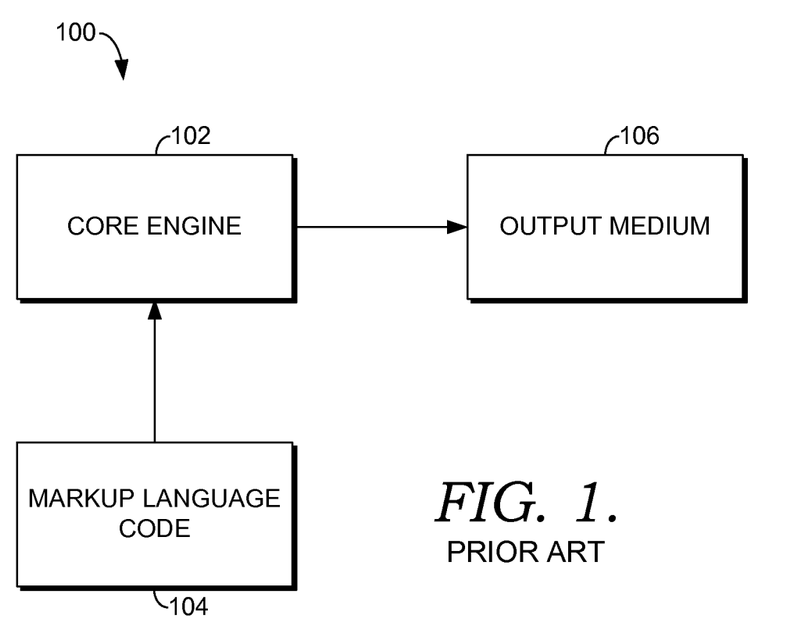
FIG. 1 is a diagram of a system showing how markup language code is currently processed by a core engine.

FIG. 1 is a diagram of a system 100 showing how the prior art processes markup language code, such as HTML markup language code. The markup language code 104 references behaviors, such as layout and rendering behaviors, supported by the core engine 102. The markup language code 104 can be, for example, an HTML that represents a web page of a web site on the Internet, or on an intranet or extranet. The core engine 102 processes the elements and otherwise processes the markup language code 104, resulting in output on an output medium 106. The core engine 102 can be part of a web browsing computer program or operating system component. The output medium 106 can be, for example, a display monitor, a printed page output by a printer, or another type of output medium.

Figure 2:
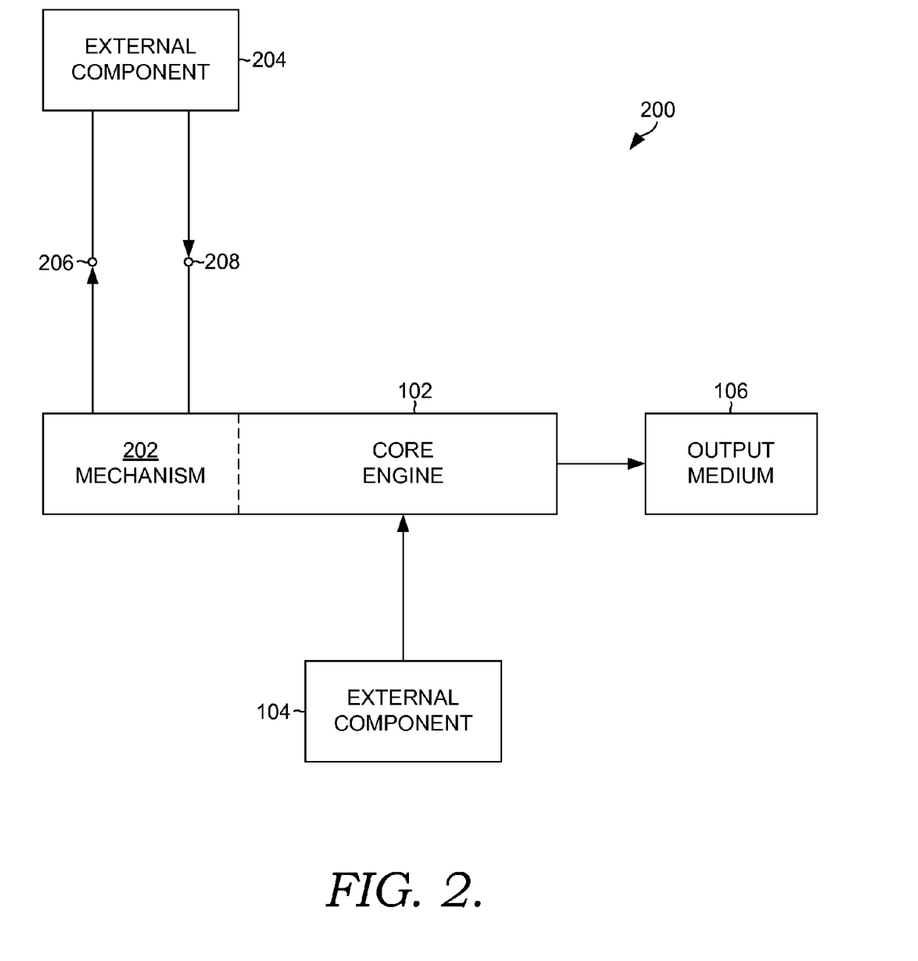
FIG. 2 is a diagram of a system showing how markup language code is processed by a core engine, where the behaviors of the core engine are extended by behaviors of an external component, according to an embodiment.

FIG. 2 is a diagram of a system 200 showing how markup language processing is accomplished by an embodiment, including extended behaviors supported by external components. The markup language code 104 is again processed by the core engine 102. However, for behaviors referenced in the markup language code 104 that are not supported by the core engine 102, a mechanism 202 exists that passes processing of these behaviors to the external component 204. The mechanism 202 can be a part of the core engine 102, as shown in FIG. 2. The result of behavior and markup language code 104 processing by the core engine 102 and the external component 204 is output on the output medium 106.

For communication between the mechanism 202 and the external component 204, there is a pair of interfaces 206 and 208. The first interface 206 is exposed by the external component 204 for querying by the mechanism 202. The second interface 208 is exposed by the mechanism 202 for querying by the external component 204. The presence of two interfaces allows the external component 204 to process a behavior to any degree desired, since communication is two-way between the external component 204 and the mechanism 202. For example, the behaviors supported by the external component 204 may completely override comparable behaviors supported by the core engine 102. Alternatively, the behaviors supported by the component 204 may complement, or supplement, the comparable behaviors of the core engine 102. That is, the behaviors of the external component 204 can participate with the behaviors of the core engine 102 to any degree. It is noted that the pair of interfaces 206 and 208 for purposes of extended behaviors is in addition to other, known interfaces that may already be present for communication between the core engine 102 and the mechanism 202. These other, known interfaces are not shown in FIG. 2 for illustrative clarity.

The behaviors supported by the external component 204 can be layout behaviors or rendering behaviors. Rendering behaviors generally are behaviors that specify how markup language elements are to be rendered, or drawn, on the medium 106. Layout behaviors generally are behaviors that specify how markup language elements are to be laid out, or positioned and sized, on the medium 106. Each of these behaviors can be attached behaviors or element behaviors. Attached behaviors are attached in a non-permanent manner to a markup language element. An element in a markup language is a discrete entity that can be any content contained between the tags, and any attributes the tags may have. Such behaviors can be applied, or mapped, to an element, and subsequently removed from the element. Conversely, element behaviors are permanently attached to a markup language element. They cannot be later removed once applied to an element.

An example of how a behavior supported by the external component 204 can be an attached behavior applied and then unapplied to an HTML element is:

<DIV STYLE="behavior: url (http://www.abc.com/object.dll);">
</DIV>

In this example, the behavior is implemented by the external component "object.dll". This behavior is attached to the HTML element, and later unattached to the HTML element.

An example of how a behavior supported by the external component 204 can be an element behavior permanently applied to an HTML element is:

```
<?import namespace="foo"
implementation="http://www.abc.com/object.dll")>
<foo:bar>
</foo:bar>
```

In this example, "foo" is identified as a namespace, such that all the tags associated with this namespace are implemented by the external component "object.dll". This behavior is attached to the element "bar" in the "foo" namespace. As an element behavior, it cannot be unattached to the HTML element once it has been attached.

Figure 3:
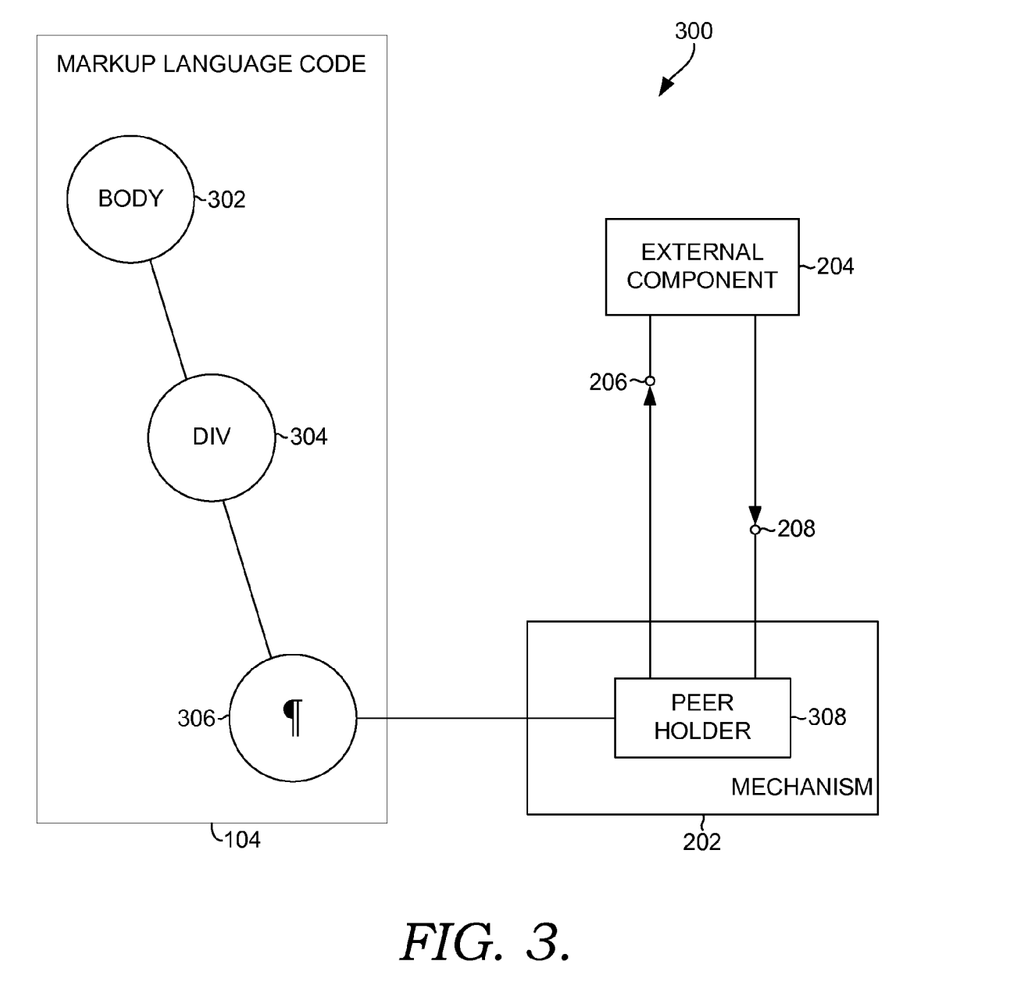
FIG. 3 is a diagram showing in more detail how markup language code references behaviors supported by an external component, according to an embodiment.

FIG. 3 is a diagram of a system 300 showing in more detail how markup language code can reference an external component 204 that supports an extended behavior. The markup language code 104 specifically has a body component 302, a div component 304, and a paragraph component 306. The body component 302, the div component 304, and the paragraph component 306 have no externally defined behavior and are handled by the core engine 102. The paragraph component 306 references a peer holder 308 within the mechanism 202. The peer holder 308 accesses the interface 206 of the external component 204, and likewise exposes the interface 208 that is accessed by the external component 204.

Figure 4:
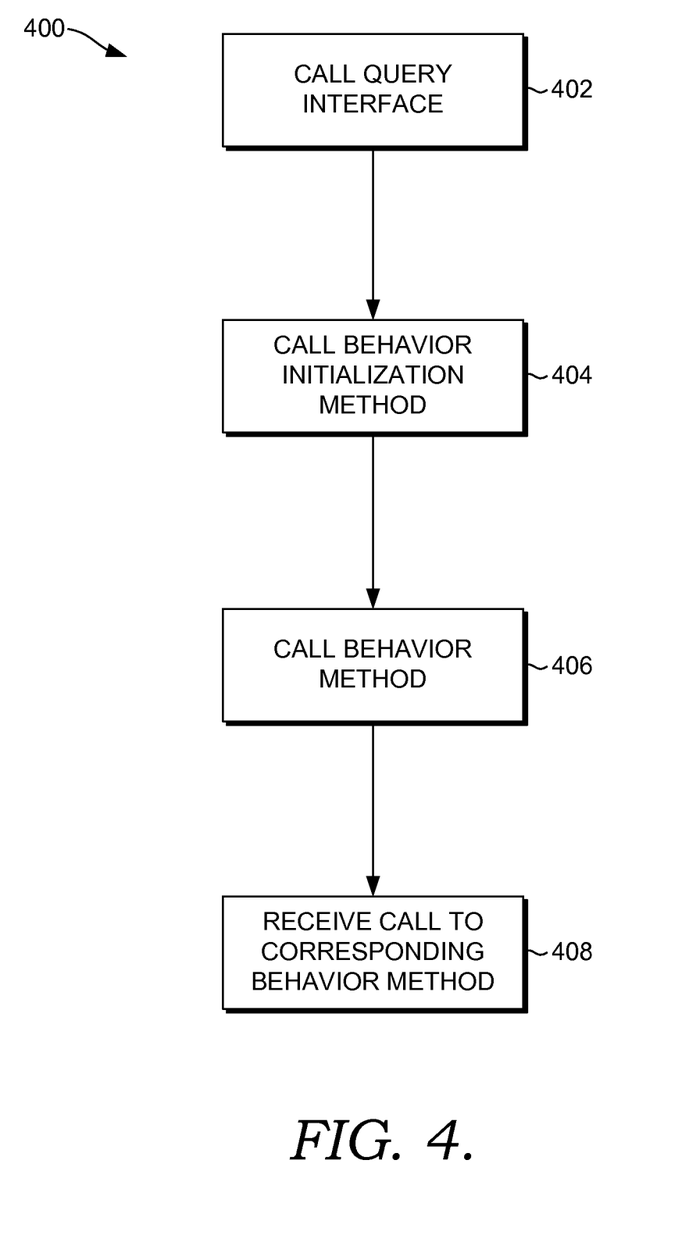
FIG. 4 is a flowchart of a method performed by a mechanism that can be part of the core engine to support extended behaviors of external components, according to an embodiment.

FIG. 4 is a flowchart of a method 400 showing how the mechanism 202 provides for extended behaviors supported by external components, such as the external component 204, which is specifically used for the description of the method 400 as an example. In 402, the mechanism 202 calls a query interface of the external component 204. The query interface is a standard interface, which the mechanism 202 calls to obtain a pointer to the first interface 206 exposed by the external component 204. In addition, the mechanism 202 passes a pointer to the second interface 208 that it exposes, to the external component 204, by the query interface call.

The mechanism then calls a behavior initialization method of the first interface 206 in 404. In response to this call, the external component 204 indicates the type of extended behavior that it is supporting, either a layout behavior or a rendering behavior. The external component 204 also indicates how this behavior of the component 204 will participate with the comparable behavior of the core engine 102. The comparable behavior of the core engine 102 is the behavior of the core engine 102 that the extended behavior supported by the external component 204 is replacing, supplementing, complementing, or to which the extended behavior otherwise relates.

Where the behavior supported by the external component 204 is a layout behavior, participation of this behavior with the comparable behavior of the core engine 102 is preferably in one of two ways. First, the behavior can be fully delegated to the external component 204 from the core engine 102. Second, the behavior implemented by the external component 204 can be called after the comparable behavior of the core engine 102 is performed. A complete example of such layout behaviors is presented in a subsequent section of the detailed description.

Where the behavior supported by the external component 204 is a rendering behavior, participation of this behavior with the comparable behavior of the core engine 102 is also preferably in one of two ways. First, the rendering by the behavior of the external component 204 can completely replace rendering by the comparable behavior of the core engine 102. Second, the rendering by the behavior of the external component 204 can be interspersed with rendering by the comparable behavior of the core engine 102. A complete example of such rendering behaviors is also presented in a subsequent section of the detailed description.

As necessary, the mechanism calls a behavior method of the first interface 206 in 406. The behavior method is called when the core engine 102 is providing the comparable behaviors to the behavior of the external component 204. This is done so that the behavior of the external component 204 can participate in processing with the comparable behaviors of the core engine 102. Similarly, the mechanism receives calls from the external component 204 to a corresponding behavior method of the second interface 208 in 408. When the external component 204 needs to submit information to the core engine 102, it calls this method of the second interface 208. This is also done so that the behavior of the external component 204 can properly participate with the comparable behaviors of the core engine 102. Examples of behavior methods of the first interface 206 and of corresponding behaviors methods of the second interface 208 are described in subsequent sections of the detailed description, with respect to layout and rendering behaviors.

Rendering Behaviors

Figure 5:
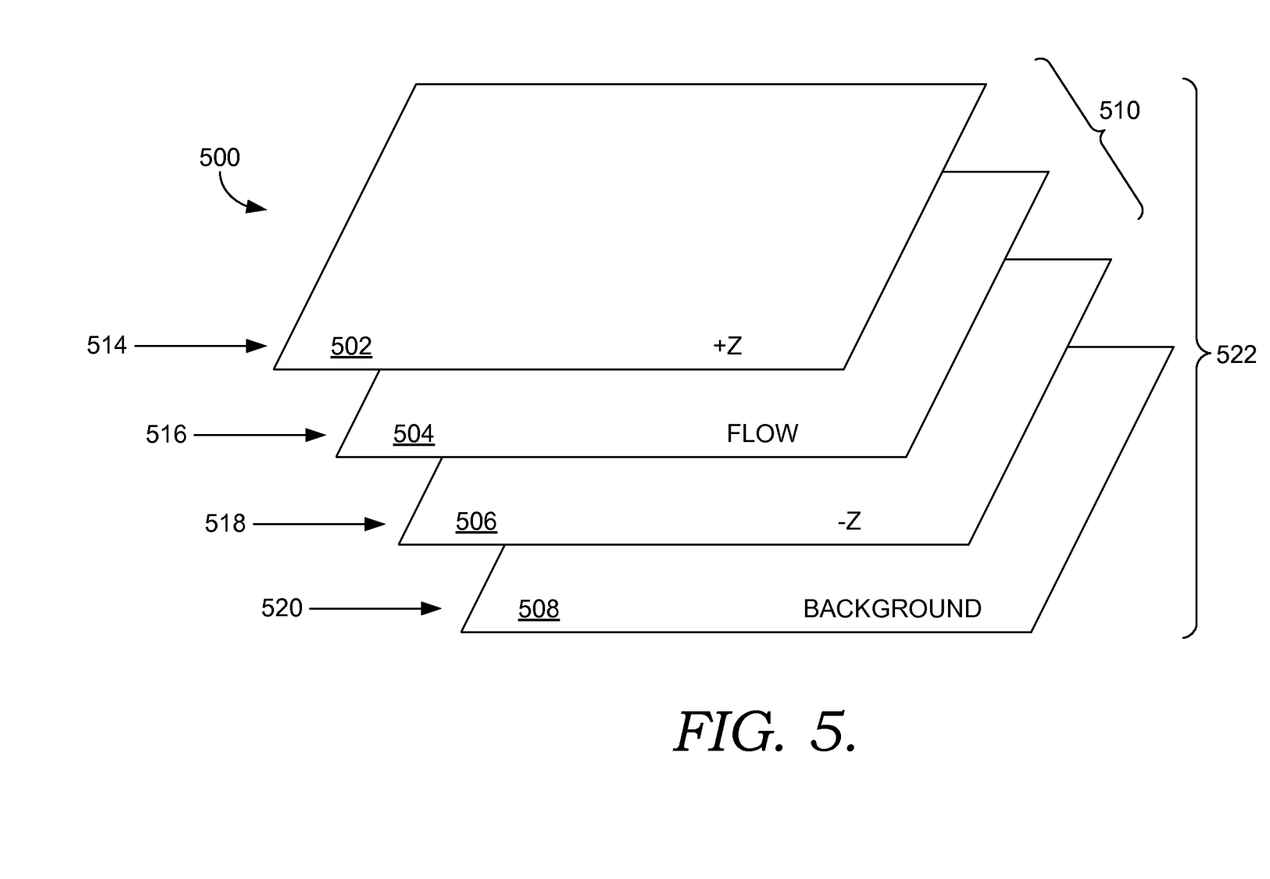
FIG. 5 is a diagram showing the various layers of the rendering process.

Extended rendering behaviors supported by the external component 204 are described in this section of the detailed description. FIG. 5 is a diagram 500 showing how the core engine 102 divides rendering among a number of layers, and how the behavior of the external component 204 can participate with the behaviors of the core engine 102. There are layers 502, 504, 506, and 508. The layers 502, 504, and 506 are referred to as content layers. The flow layer 504 is the layer on which text is drawn. There can be a number of layers above and below the flow layer 504, such as the positive z layer 502 above the flow layer 504, and the negative z layer 506 below the flow layer 504. Below all of these layers is the background layer 508.

Rendering behaviors supported by the external component 204 can interact with the different layers of the diagram 500 in two primary ways. First, the behaviors can intersperse their drawing with the rendering performed by the behaviors of the core engine 102. Second, the behaviors can effect wholesale replacement of the drawing process from the behaviors of the core engine 102. With respect to the former, the rendering behaviors supported by the external component 204 can draw below the content, after the background layer 508 is drawn, as indicated by the arrow 520. The rendering behaviors can also draw below the flow layer 504, where the behavior is called after the elements with a negative z-index are drawn, as indicated by the arrow 518. The rendering behaviors can draw above the flow layer, after the elements of the low are drawn, as indicated by the arrow 516. Finally, the rendering behaviors can draw above the content, after the elements with a positive z-index are drawn, as indicated by the arrow 514.

With respect to wholesale replacement of the drawing process, the rendering behaviors supported by the external component 204 can replace the drawing of all the layers 502, 504, 506, and 508, as indicated by the curved bracket 522. The rendering behaviors can also replace just the content layers 502, 504, and 506, as indicated by the curved bracket 510. Finally, the rendering behaviors supported by the external component 204 may replace only the background layer 508, as indicated by the arrow 512. Two options not indicated in the diagram 500 of FIG. 5 include, first, rendering behaviors may have a "none" setting, in which they do not affect the drawing process of the behaviors of the core component 102 at all. Second, there can be a "window top" setting by which the behavior supported by the external component 204 is called after the entire markup language page has been drawn, such that the behavior draws on top of all the content on the page.

As has been described in conjunction with FIGS. 2 and 3, there is a pair of interfaces 206 and 208 for communication between the external component 204 and the mechanism 202 that can be a part of the core engine 102. With respect to rendering behaviors, the interface 206 exposed by the external component 204 is referred to as IHTMLPainter, whereas the interface 208 exposed by the mechanism 202 is referred to as IHTMLPaintSite. The external component may also expose two other interfaces 206, referred to as IHTMLPainterEventInfo, and IHTMLPainterOverlay. Each of these interfaces is described in turn.

The IHTMLPainter interface is specified as follows.

| | | |
|---|---|---|
| IHTMLPainter | | |
| Draw( | | |
| [in] RECT rcBounds | | Bounds of the object relative to the DC's origin |
| [in] RECT rcUpdate | | Bounds of the update region relative to the DC's origin |
| [in] LONG lDrawFlags | | Flags affecting drawing |
| [in] HDC hdc | | The device context handle (or NULL) |
| [in] LPVOID pvDrawObject | | Pointer to a surface object (or NULL) |

-continued

```
[out] HTML_PAINTER_INFO* pInfo    Characteristics of the rendering
                                  behavior
);
```

This structure allows the behavior to convey information to the core engine. The fields are defined as follows.

```
typedef struct _HTML_PAINTER_INFO
{
    LONG lFlags;
    LONG lZOrder;
    IID iidDrawObject;
    RECT rcExpand;
} HTML_PAINTER_INFO;
HitTestPoint(
[in] POINT pt,           Point in coordinates relative to the rcBounds
                         origin where the hit occurs
[out] BOOL *pbHit        Returns true if the element is actually hit
[out] LONG *plPartID     returns a part ID number, indicating which
part of the element was hit. If an event is fired as a result
of this hit-test, the part ID is made available in the event object
);
OnResize( [in] SIZE size);       called whenever the element is
resized, and informs the component of the new size.
```

The IHTMLPainter interface has four methods: Draw, GetPainterInfo, HitTestPoint, and OnResize. The Draw method corresponds to what has been referred to as the behavior method of the first interface 206 in 406 of FIG. 4. The GetPainterInfo method corresponds to what has been referred to as the behavior initialization method of the first interface 206 in 404 of FIG. 4. The HitTestPoint method and the OnResize method also correspond to what has been referred to as the behavior method of the first interface 206 in 406 of FIG. 4. Each of these methods is now described in turn.

With respect to the GetPainterInfo method, the mechanism 202 that can be a part of the core engine 102 calls this method to determine how the behavior of the external component 204 desires to participate in the rendering process. In particular, the external component 204 returns information in the structure HTML_PAINTER_INFO. The lFlags are a combination of the following.

| | |
|---|---|
| HTMLPAINTER_OPAQUE = 0x000001, | the component paints every pixel in its drawing rectangle |
| HTMLPAINTER_TRANSPARENT = 0x000002, content to show through | the component may not draw every pixel, allowing lower |
| HTMLPAINTER_ALPHA = 0x000004, | the component does alpha-blending with lower content |
| HTMLPAINTER_COMPLEX = 0x000008, | the component does full compositing with lower content |
| HTMLPAINTER_OVERLAY = 0x000010, content | the component uses a hardware overlay buffer to draw its |
| HTMLPAINTER_HITTEST = 0x000020, | the component wishes to participate in hit-testing |
| HTMLPAINTER_SURFACE = 0x000100, | the component draws to a surface |
| HTMLPAINTER_3DSURFACE = 0x000200, | the component draws to a 3D surface |
| HTMLPAINTER_NOBAND = 0x000400, | the component is not prepared to draw its content in bands |
| HTMLPAINTER_NODC = 0x001000, | the component does not need a DC |
| HTMLPAINTER_NOPHYSICALCLIP = 0x002000, does its own clipping | the component does not need a physical clip set on the DC; it |
| HTMLPAINTER_NOSAVEDC = 0x004000, drawing; calls to Draw( ) do not need to be bracketed by SaveDC( ) and RestoreDC( ) | the component does not change the state of the DC during |
| HTMLPAINTER_SUPPORTS_XFORM = 0x008000, while drawing | the component is prepared to use a complex transformation |
| HTMLPAINTER_EXPAND = 0x010000 | the component wishes the core engine to honor the rcExpand |
| HTMLPAINTER_NOSCROLLBITS = 0x020000 instead must ask the component to redraw | the core engine cannot scroll this element by copying bits, but |

-continued

```
);
GetPainterInfo(
```

The surfaces referred to can be DirectDraw surfaces, as known within the art. The DC referred to is a device context, as known within the art. The LZOrder indicates the drawing layer at which the Draw method should be called. This can be one of the following.

```
HTMLPAINT_ZORDER_NONE = 0,
HTMLPAINT_ZORDER_REPLACE_ALL = 1,
HTMLPAINT_ZORDER_REPLACE_CONTENT = 2,
HTMLPAINT_ZORDER_REPLACE_BACKGROUND = 3,
HTMLPAINT_ZORDER_BELOW_CONTENT = 4,
HTMLPAINT_ZORDER_BELOW_FLOW = 5,
HTMLPAINT_ZORDER_ABOVE_FLOW = 6,
HTMLPAINT_ZORDER_ABOVE_CONTENT = 7,
HTMLPAINT_ZORDER_WINDOW_TOP = 8,
```

The iidDrawObject refers to the type of surface that is desired by the external component 204. For example, if the component 204 wishes to draw to a specific type of DrawObject, which is a known type of object, this is the interface identifier, or IID, of that object. If the component draws to a GDI device context, which is a known type of context, this is all zeros. Finally, rcExpand indicates the number of pixels needed on each side of the standard drawing rectangle for drawing outside of the rectangle. For example, the external component 204 in an editing framework may wish to draw a hatched border outside an element, to indicate that the element has been selected for editing.

With respect to the Draw method, when the core engine 102 is performing the rendering process, the Draw method is called as has been requested by the external component 204. The external component 204 can thus participate at any level of granularity within the rendering process. The rectangle rcBounds indicates where on the surface, relative to the device context's origin, the external component 204 should draw. The rectangle rcUpdate indicates what actually needs to be drawn—needs to be updated—relative to the device context's origin. Either hdc or pvDrawObject is non-null, and is the surface on which the external component 204 actually draws. If the component 204 has previously requested a particular DrawObject, then pvDrawObject will point to such an object, and hdc will be null. Otherwise, hdc is a handle to a GDI device context, and pvDrawObject is null. The LDrawFlags are set to any combination of the following flags.

```
HTMLPAINT_DRAW_UPDATEREGION    An update region is
available; its bounding rectangle is given by rcUpdate
HTMLPAINT_DRAW_USE_XFORM       A complex transform is
in effect; the component must obtain the matrix describing the transform
and apply it to all drawing coordinates before rendering onto the surface
```

The former flag indicates if the update region is different than as specified by rcUpdate. The latter flag indicates that a transform, such as zoom or rotation, is in effect.

With respect to the HitTestPoint method, this method is called to decide if a given point, such as the point under the pointer, hits the component (i.e., is drawn by the external component 204). The HitTestPoint method thus lets the external component 204 to react to its element being hit. pt indicates the point that has been hit. If a hit actually has occurred, as determined by the external component 204, then pbHit is returned as true. If a particular part of an element has been hit, then the part is identified using plPartID.

Finally, with respect to the OnResize method, this method is called whenever the element controlled by the external component 204 has been resized. The core engine 102, through the mechanism 202 calling this method, also informs the external component 204 of the new size.

The IHTMLPainterSite interface is specified as follows.

```
IHTMLPaintSite
InvalidatePainterInfo( );     Allows the rendering behavior to indicate
``` that some of the its characteristics have changed. The core engine in turn calls GetPainterInfo to get the new data.

```
InvalidateRect([in] RECT* prcInvalid
);
```
Invalidates a rectangle and forces a draw. The rectangle's coordinates are given relative to the origin of the element.
Passing NULL invalidates the entire element.
```
InvalidateRegion(
   [in] HRGN rgnInvalid
);
```
Invalidates a region and forces a draw. The region's coordinates are given relative to the origin of the element.
```
GetDrawInfo(
[in] LONG lFlags,    Specifies information needed.
 [out] HTML_PAINT_DRAW_INFO* pDrawInfo
);
```
Gets additional information about the Draw( ) call in progress.

The information is returned in the following structure:

```
typedef struct HTML_PAINT_DRAW_INFO
{
    RECT rcViewport;
    HRGN hrgnUpdate;
    HTML_PAINT_XFORM xform;
}
TransformGlobalToLocal(
    [in] POINT ptGlobal,       - point in global coordinates
                                 (relative to canvas window)
    [out] POINT *pptLocal      - return point in local coordinates
                                 (relative to element's top-left)
   );
TransformLocalToGlobal(
    [in] POINT ptLocal,        - point in local coordinates
                                 (relative to element's top-left)
    [in] POINT *pptGlobal      - return point in global coordinates
                                 (relative to canvas window)
   );
GetHitTestCookie( [out] LONG* plCookie )   - when an event is
```
fired as a result of a hit-test, the core engine makes an identifier of the element that was hit available in the event object. If a component needs to know this identifier before deciding if the element is hit, it can discover it by calling this method.

The IHTMLPainterSite interface has seven methods: InvalidatePainterinfo, InvalidateRect, InvalidateRegion, GetDrawInfo, TransformGlobaltoLocal, TransformLocaltoGlobal, and GetHitTestCookie. Each of these methods corresponds to what has been referred to as the corresponding behavior method of the second interface 208 in 408 of FIG. 4. Each of these methods is now described in turn.

With respect to the InvalidatePainterinfo method, the external component 204 calls this method when any of the information it has previously supplied in response to a GetPainterInfo method call is out of date. In response, the mechanism 202 that can be part of the core engine 102 will call the GetPainterInfo method to acquire the up-to-date information. With respect to the InvalidateRect method, the external component 204 calls this method when its picture is out of date, as specified by a rectangle. This invalidates its rectangle, and forces the mechanism 202 that can be part of the core engine 102 to force a draw. With respect to the InvalidateRegion method, the external component 204 similarly calls this method when its picture is out of date, but as specified by a non-rectangular region.

With respect to the GetDrawInfo method, the external component 204 calls this method to receive the additional information that has been indicated as available when the mechanism 202 called the Draw method of the external component 204. The LFlags can be set by a combination of the following:

HTMLPAINT_DRAWINFO_VIEWPORT = 0x000001, return the rcViewport
HTMLPAINT_DRAWINFO_UPDATEREGION = 0x000002, return the hrgnUpdate
HTMLPAINT_DRAWINFO_XFORM = 0x000004, return the transform The rcViewPort is the part of a region that is currently in view. For example, when the scrollable, the part in the window that is currently visible is specified by the rcViewPort. This is useful to the external component 204 if it wishes to draw a fixed background, such as a watermark, behind scrollable content. hrgnUpdate is the update region, describing the minimal surface area that needs repainting, and is contained within the rcUpdate passed to the Draw method. xform is the transformation matrix that is applied to the drawing coordinates before rendering. This is an affine linear transformation in the following format.

```
typedef struct HTML_PAINT_XFORM
{
    float eM11;
    float eM12;
    float eM21;
    float eM22;
    float eDx;
    float eDy;
}
```

With respect to the TransformGlobalToLocal and the TransformLocalToGlobal methods, these methods are called to transform a point in global coordinates to local coordinates, and vice-versa. Finally, with respect to the GetHitTestCookie method, if the external component 204 needs to know the identifier of the element that was hit before deciding if it is in fact hit, the external component 204 calls this method. For example, the external component 204 may need to call this method to maintain its own internal data structures, or those of a framework to which it belongs.

The IHTMLPainterEventInfo is specified as follows.

```
IHTMLPainterEventInfo
GetEventInfoFlags([out] LONG* plEventInfoFlags);   - the component
describes how it will participate by setting some combination of flags.
GetEventTarget([out] IHTMLElement **ppElement);
SetCursor( [in] LONG lPartID );
StringFromPartID(
    [in] LONG lPartID,           - a part ID, as returned by the
                                   component in HitTestPoint
    [out] BSTR *pbstrPart        - the name of the part
);
```

The IHTMLPainterEventInfo interface allows the external component 204 to participate more fully in special forms of rendering and hit testing. This interface is used primarily to participate in editing frameworks. The interface has four methods: GetEventInfoFlags, GetEventTarget, SetCursor, and StringFromPartID. Each of these methods can correspond to what has been referred to as the behavior method of the first interface 206 in 406 of FIG. 4. Each of the methods is described in turn.

With respect to the GetEventInfoFlags method, the external component 204 describes how it wants to participate by setting a combination of the following flags.

HTML_PAINT_EVENT_FLAGS_TARGET = 0x01,- the component wishes to receive GetEventTarget calls HTML_PAINT_EVENT_FLAGS_CURSOR = 0x02,- the component wishes to receive GetCursor calls With respect to the GetEventTarget method, when the external component 204 returns true from a hit test, the core engine 102 may fire events as a result. These events are normally fired on the element to which the component 204 is attached. The component 204, however, can cause them to be fired on a different element, by returning that element in this method.

With respect to the SetCursor method, after a successful hit, the core engine 102 calls this method to give the external component 204 an opportunity to change the cursor, by passing in the partID the element returned in HitTestPoint. Finally, with respect to the StringFromPartID method, this method extends a known method IHTMLElement:: componentFromPoint to rendering behaviors. If the point belongs to an external component 204, this method is called to ask the component for the name of the part that was hit.

The IHTMLPainterOverlay interface is specified as follows.

```
IHTMLPainterOverlay
OnMove( [in] RECT rcDevice );
```

This interface is supported by the external component 204 if it supports a rendering behavior that wishes to use a hardware overlay buffer. The interface has one method, OnMove, which can correspond to what has been referred to as the behavior method of the first interface 206 in 406 of FIG. 4. This method is called when the position of the element on the hardware device changes, and provides the new position of the element. This allows the component to update the hardware overlay buffer for the element correctly.

Layout Behaviors

Extended layout behaviors supported by the external component 204 are described in this section of the detailed description. The behaviors can use the interfaces described in this section to specify their size and position. Furthermore, the behaviors can use the interfaces described in this section to modify their natural size in order to have more or less space allocated to them.

Layout behaviors supported by the external component 204 can interact with the natural sizing of elements that is normally performed by the core engine 102 in three ways. First, layout can be completely delegated to the external component 204. Second, layout can be modified by the external component 204 after the core engine has proposed a natural size for the element. Third, the layout behavior can specify that it is also a rendering behavior that needs additional space outside the element's borders.

As has been described in conjunction with FIGS. 2 and 3, there is a pair of interfaces 206 and 208 for communication between the external component 204 and the mechanism 202 that can be a part of the core engine 102. With respect to layout behaviors, the interface 206 exposed by the external component 204 is referred to as IElementBehaviorLayout, whereas the interface 208 exposed by the mechanism 202 is referred to as IElementBehaviorSiteLayout. Each of these interfaces is described in turn.

The IElementBehaviorLayout interface is specified as follows.

```
IElementBehaviorLayout {
    GetLayoutInfo( LONG * plFlags );
    GetSize([in] long lCalcMode,
            [in] SIZE sizeContent,
            [in, out] POINT *ptOffset,
            [in, out] POINT *ptOffset,
            [in, out] SIZE *psize );
    GetPosition( [in] LONG lFlags,
            [in, out] POINT* pptTopLeft);
    MapSize([in] SIZE * psizeIn,
            [out] RECT * prcOut);
}
```

The interface has four methods: GetLayoutInfo, GetSize, GetPosition, and MapSize. The GetLayoutInfo method corresponds to what has been referred to as the behavior initialization method of the first interface 206 in 404 of FIG. 4. The other methods correspond to what has been referred to as the behavior method of the first interface 206 in 406 of FIG. 4. Each of these methods is described in turn.

With respect to the GetLayoutInfo method, the mechanism 202 that can be a part of the core engine 102 calls this method to determine whether the external component 204 wants to participate in layout participation either before and/or after natural sizing occurs by the core engine 102. There are three values that are recognized, as follows.

```
0x01 - FULLDELEGATION -- the behavior completely owns sizing
0x02 - MODIFYNATURAL -- the behavior wants to modify the
natural-content-size/ proposed-size
0x04 - MAPSIZE -- the behavior is also a rendering behavior that needs
additional space outside the borders.
MapSize( ) is only called if this flag is turned on.
```

If FULLDELEGATION is specified, then MODIFYNATURAL is ignored.

With respect to the GetSize method, the mechanism 202 calls this method when it needs to determine the size of the element controlled by the external component 204. The LCalcMode parameter passed to this method is used to determine the layout mode, which can be minimum, min-max, or natural sizing passes. These enumerated values describe the various layout passes the layout may put its element through. These are the following layout calculation modes.

```
0x0001 - BEHAVIORLAYOUTMODE_NATURAL - The core engine is asking for the natural size of the element.
Both width and height must be returned.
0x0002 - BEHAVIORLAYOUTMODE_MINWIDTH - The core engine is asking for dimension of the element if
the width is minimized. In essence, the core engine is asking, "If you have to be as narrow as you can possibly be,
what size are you?"
0x0004 - BEHAVIORLAYOUTMODE_MAXWIDTH - The core engine is asking for dimension of the element if
the width is maximized. In essence, the core engine is asking, "If you are allowed to be as wide as you want to be,
what size are you?"
0x4000 - BEHAVIORLAYOUTMODE_MEDIA_RESOLUTION - The core engine is operating in a resolution
defined by a media type. This flag is turned on when a non-default resolution is being used for measuring. One
example of when this can happen is for printing. High-resolution screens, or explicitly author-specified resolutions,
may also enable this. In these cases, the behavior can call GetResolution( ) on the site interface to get the x and y
resolution, in units per inch.
0x8000 - BEHAVIORLAYOUTMODE_FINAL_PERCENT - This flag is set when the core engine is running
through a final pass to layout out percent-sized children. This pass happens when a sized-to-content element
changes size as a result of the first measuring pass, and has percent-sized children that may need to resize
themselves to adjust.
``` sizeContent refers to the default size. The first ptOffset refers to the location of the content, whereas the second ptOffset refers to the location of the bounding box. psize refers to the size of the bounding box.

During layout of the element, before entering the core engine's own CalcSize method, the behavior's GetSize method is synchronously called if the behavior registered for full delegation. The behavior is passed the proposed size, which is the size of the parent element, and the returned size is actually used as the element's size. If full delegation has been requested, natural sizing is skipped, however. Otherwise, natural sizing occurs first, and then during the CalcSize call, just before returning, the behavior's GetSize method is called. The behavior is passed the proposed size, as well as the natural size of the content alone. The behavior has an opportunity to modify the element's size, before CalcSize is returned from.

With respect to the GetPosition method, the mechanism 202 calls this method when it needs to determine the position of the element controlled by the external component 204. lFlags are as specified in the previous section of the detailed description. pptTopLeft is the position of the upper left-hand corner relative to the parent of the current element. Finally, with respect to the Map Size method, the mechanism 202 calls this method only if the MAPSIZE flag has been turned on, where the layout behavior supported by the external component 204 is also a rendering behavior. With an input size specified by psizeIn, the method returns the actual rectangle needed as prcOut.

The IElementBehaviorSiteLayout interface is specified as follows.

```
IElementBehaviorSiteLayout {
    InvalidateLayoutInfo( );
    InvalidateSize( );
    GetMediaResolution([out] size* psize);
}
```

This interface has three methods: InvalidateLayoutInfo, InvalidateSize, and GetMediaResolution. Each of these methods corresponds to what has been referred to as the corresponding behavior method of the second interface 208 in 408 of FIG. 4. Each of these methods is described in turn.

With respect to the InvalidateLayoutInfo method, the external component 204 calls this method when its layout information is out of date. More specifically, this method is called to change the delegation mode. If the method is not called, changes to the delegation mode may not have any effect. With respect to the InvalidateSize method, the external component 204 calls this method when its size is out of date. More specifically, this method is called to indicate that the element's layout needs to be remeasured, and is treated as a forced remeasure request by the mechanism 202 and the core engine 102. Finally, with respect to the GetMediaResolution method, the external component 204 calls this method to retrieve the current measuring resolution, which is returned in units per inch for both the x and y directions. The current measuring resolution may change depending on whether the output medium is, for example, a display screen, as opposed to a page printed by a printer.

Example Computerized Device

Figure 6:
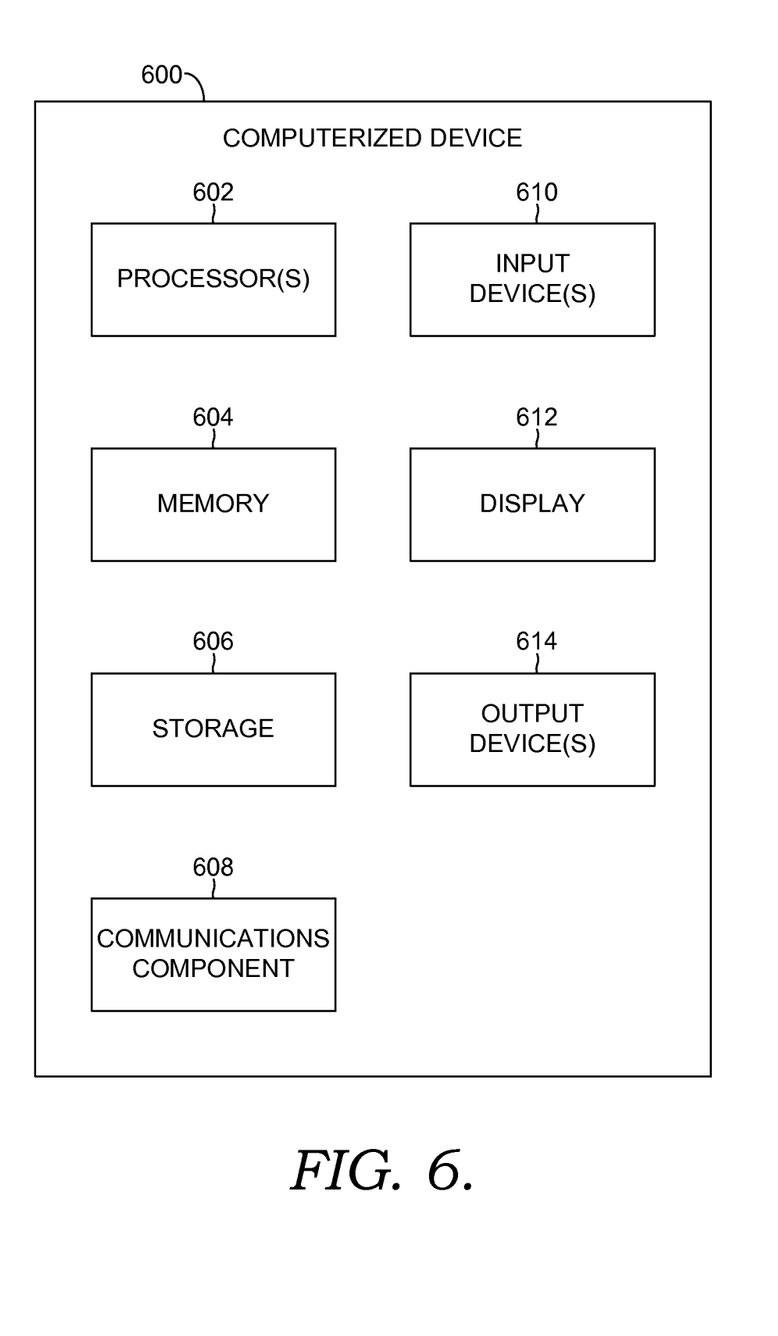
FIG. 6 is a diagram of an example computerized device that can be used to implement one or more embodiments.

Embodiments can be implemented within a computerized environment having one or more computerized devices. The diagram of FIG. 6 shows an example computerized device 600. The computerized device 600 may be the device in which the system 200 of FIG. 2 is implemented. The example computerized device 600 can be, for example, a desktop computer, a laptop computer, or a personal digital assistant (PDA). One or more embodiments may be implemented with other computer system configurations as well, including multiprocessor systems, microprocessor-based or programmable consumer electronics, network computers, minicomputers, and mainframe computers. One or more embodiments may be implemented in distributed computing environments where tasks are performed by remote processing devices that are linked through a communications network.

The device 600 includes one or more of the following components: processor(s) 602, memory 604, storage 606, a communications component 608, input device(s) 610, a display 612, and output device(s) 614. For a particular instantiation of the device 600, one or more of these components may not be present. For example, a PDA may not have any output device(s) 614. The description of the device 600 is to be used as an overview of the types of components that typically reside within such a device, and is not meant as a limiting or exhaustive description.

The processor(s) 602 may include a single central-processing unit (CPU), or a plurality of processing units, commonly referred to as a parallel processing environment. The memory 604 may include read-only memory (ROM) and/or random-access memory (RAM). The storage 606 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 600 may operate in a network environment. Examples of networks include the Internet, intranets, extranets, local-area networks (LANs), and wide-area networks (WANs). The device 600 may include a communications component 608, which can be present in or attached to the device 600. The component 608 may be one or more of a network card, an Ethernet card, an analog modem, a cable modem, a digital subscriber loop (DSL) modem, and an Integrated Services Digital Network (ISDN) adapter. The input device(s) 610 are the mechanisms by which a user provides input to the device 600. Such input device(s) 610 can include keyboards, pointing devices, microphones, joysticks, game pads, and scanners. The display 612 is how the device 600 typically shows output to the user. The display 612 can include cathode-ray tube (CRT) display devices and flat-panel display (FPD) display devices. The device 600 may provide output to the user via other output device(s) 614. The output device(s) 614 can include speakers, printers, and other types of devices.

The methods that have been described can be computer-implemented on the device 600. A computer-implemented method is desirably realized at least in part as one or more programs running on a computer. The programs can be executed from a computer-readable medium such as a memory by a processor of a computer. The programs are desirably storable on a computer or machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the described embodiments. Therefore, it is intended that the specific features and steps disclosed be limited only by the claims and equivalents thereof.

We claim:

1. One or more computer-readable devices, comprising:
 a data structure configured to represent a pair of interfaces for implementing an extended rendering behavior of an external component that participates in rendering with a comparable rendering behavior of a core engine via a mechanism through the pair of interfaces, the pair of interfaces comprising:
  a first interface returnable for the extended rendering behavior by the external component for calling by the mechanism, the first interface configured to provide at least a drawing method to request that the external component perform drawing rendering capability, and an initial method to request that the external component specify how the extended rendering behavior is to participate in rendering with the comparable rendering behavior of the core engine; and
  a second interface exposable by the mechanism for calling by the external component during participation in rendering, the second interface configured to provide at least an invalidate rectangle method to specify that a rectangle rendered by the external component is out-of-date, and an invalidate region method to specify that a non-rectangular region rendered by the external component is out-of-date.

2. The one or more computer-readable devices of claim 1, wherein the first interface is further configured to provide a hit method to indicate to the extended rendering behavior that functionality related to the rectangle rendered by the external component is requested to be performed.

3. The one or more computer-readable devices of claim 1, wherein the second interface is further configured to provide a retrieve information method to obtain information responsive to a request by the external component in the initial method of the first interface.

4. The one or more computer-readable devices of claim 1, wherein the second interface is further configured to provide a global-to-local transform method to transform a point from global coordinates to local coordinates, and a transform local-to-global transform method to transform a point from local coordinates to global coordinates.

5. The one or more computer-readable devices of claim 1, wherein the second interface is further configured to provide a hit method to determine an identifier for a specific component before the specific component is hit.

6. The one or more computer-readable devices of claim 1, wherein the data structure is further configured to represent an additional interface returnable for the extended rendering behavior by the external component for calling by the mechanism, the additional interface configured to provide at least:
an additional initial method to request that the external component specify how the extended rendering behavior is to participate in rendering with the comparable rendering behavior of the core engine as the rendering relates to events; and
an event target method to request that an event fire an element other than an element to which the external component is attached.

7. The one or more computer-readable devices of claim 6, wherein the additional interface is further configured to provide a set cursor method to allow the external component to change a cursor, and a string method to request from the external component a part name that has been hit.

8. The one or more computer-readable devices of claim 1, wherein the data structure is further configured to represent an additional interface returnable for the extended rendering behavior by the external component for calling by the mechanism, the additional interface configured to provide at least an on-move method to allow the external component to update a hardware overlay buffer usable by the extended rendering behavior.

9. One or more machine-readable devices, comprising:
a data structure configured to represent a pair of interfaces for implementing an extended layout behavior of an external component that participates in layout with a comparable layout behavior of a core engine via a mechanism through the pair of interfaces, the pair of interfaces comprising:
a first interface returnable for the extended layout behavior by the external component for calling by the mechanism, the first interface configured to provide at least a size method for the external component to specify a default size, a position method for the external component to specify a default position, and an initial method to request that the external component specify how the extended layout behavior is to participate in layout with the comparable layout behavior of the core engine; and
a second interface exposable by the mechanism for calling by the external component during participation in layout, the second interface configured to provide at least an invalidate layout method to specify that the extended layout behavior is to participate with the comparable layout behavior of the core engine differently than previously specified, and an invalidate size method to specify that a layout of the extended layout behavior is out-of-date.

10. The one or more machine-readable devices of claim 9, wherein the first interface is further configured to provide a map size method to expand a layout of the extended layout behavior beyond original borders of the layout.

11. The one or more machine-readable devices of claim of 10, wherein the extended layout behavior of the external component also comprises a rendering behavior.

12. The one or more machine-readable devices of claim 9, wherein the second interface is further configured to provide a resolution method to retrieve a current measuring resolution.

13. A method, comprising:
using a data structure to represent a first interface returnable for an extended rendering behavior by a external component for calling by a mechanism, the first interface configured to provide at least a drawing method to request that the external component perform drawing rendering capability, and an initial method to request that the external component specify how the extended rendering behavior is to participate in rendering with a comparable rendering behavior of a core engine;
using the data structure to represent a second interface exposable by the mechanism for calling by the external component during participation in rendering, the second interface configured to provide at least an invalidate rectangle method to specify that a rectangle rendered by the external component is out-of-date, and an invalidate region method to specify that a non-rectangular region rendered by the external component is out-of-date; and
using the data structure to implement the extended rendering behavior of the external component that is to participate in rendering with the comparable rendering behavior of the core engine via the mechanism through the first interface and the second interface.

14. The method of claim 13, wherein the first interface is further configured to provide a hit method to indicate to the extended rendering behavior that functionality related to the rectangle rendered by the external component is to be performed.

15. The method of claim 13, wherein the second interface is further configured to provide a retrieve information method to obtain information responsive to a request by the external component in the initial method of the first interface.

16. The method of claim 13, wherein the second interface is further configured to provide a global-to-local transform method to transform a point from global coordinates to local coordinates, and a transform local-to-global transform method to transform a point from local coordinates to global coordinates.

17. The method of claim 13, wherein the second interface is further configured to provide a hit method to determine an identifier for a specific component before the specific component is hit.

18. The method of claim 13, further comprising using the data structure to represent an additional interface returnable for the extended rendering behavior by the external component for calling by the mechanism, the additional interface configured to provide at least:
an additional initial method to request that the external component specify how the extended rendering behavior is to participate in rendering with the comparable rendering behavior of the core engine as the rendering relates to events; and
an event target method to request that an event fire an element other than an element to which the external component is attached.

19. The method of claim 18, wherein the additional interface is further configured to provide a set cursor method to allow the external component to change a cursor, and a string method to request from the external component a part name that has been hit.

20. The method of claim 13, further comprising using the data structure to represent an additional interface returnable for the extended rendering behavior by the external component for calling by the mechanism, the additional interface configured to provide at least an on-move method to allow the external component to update a hardware overlay buffer usable by the extended rendering behavior.

* * * * *